United States Patent [19]
Conway et al.

[11] Patent Number: 5,397,986
[45] Date of Patent: Mar. 14, 1995

[54] METAL DETECTOR SYSTEM HAVING MULTIPLE, ADJUSTABLE TRANSMITTER AND RECEIVER ANTENNAS

[75] Inventors: Granville T. Conway, Green Village; Karl E. Geisel, Park Ridge, both of N.J.; Dennis M. Cunningham, Greensburg, Pa.

[73] Assignee: Federal Labs Systems LP, Northvale, N.J.

[21] Appl. No.: 246,904

[22] Filed: May 20, 1994

Related U.S. Application Data

[63] Continuation of Ser. No. 786,305, Nov. 1, 1991, abandoned.

[51] Int. Cl.⁶ ............... G01R 33/12; G01R 35/00; G08B 13/24
[52] U.S. Cl. .................... 324/243; 324/202; 324/225; 340/551
[58] Field of Search ............... 324/242, 243, 202, 225, 324/232; 340/540, 541, 551, 552, 572

[56] References Cited

U.S. PATENT DOCUMENTS

| | | | |
|---|---|---|---|
| 3,758,849 | 9/1973 | Susman et al. | 324/41 |
| 3,763,424 | 10/1973 | Bennett, Jr. et al. | 324/41 |
| 4,605,898 | 8/1986 | Aittoniemi et al. | 324/232 |
| 4,623,842 | 11/1986 | Bell et al. | 324/245 |
| 4,779,048 | 10/1988 | Aichele | 324/207 |

Primary Examiner—Walter E. Snow
Attorney, Agent, or Firm—Kenyon & Kenyon

[57] ABSTRACT

A metal detector system includes two transmitter-receiver antenna pairs supported by respective side panels of a portal. The relative positions of an adjacent transmitter antenna and receiver antenna within an antenna pair may be adjusted to calibrate the antennas, such as by crossing adjacent antennas or by increasing the distance between adjacent antennas.

24 Claims, 11 Drawing Sheets

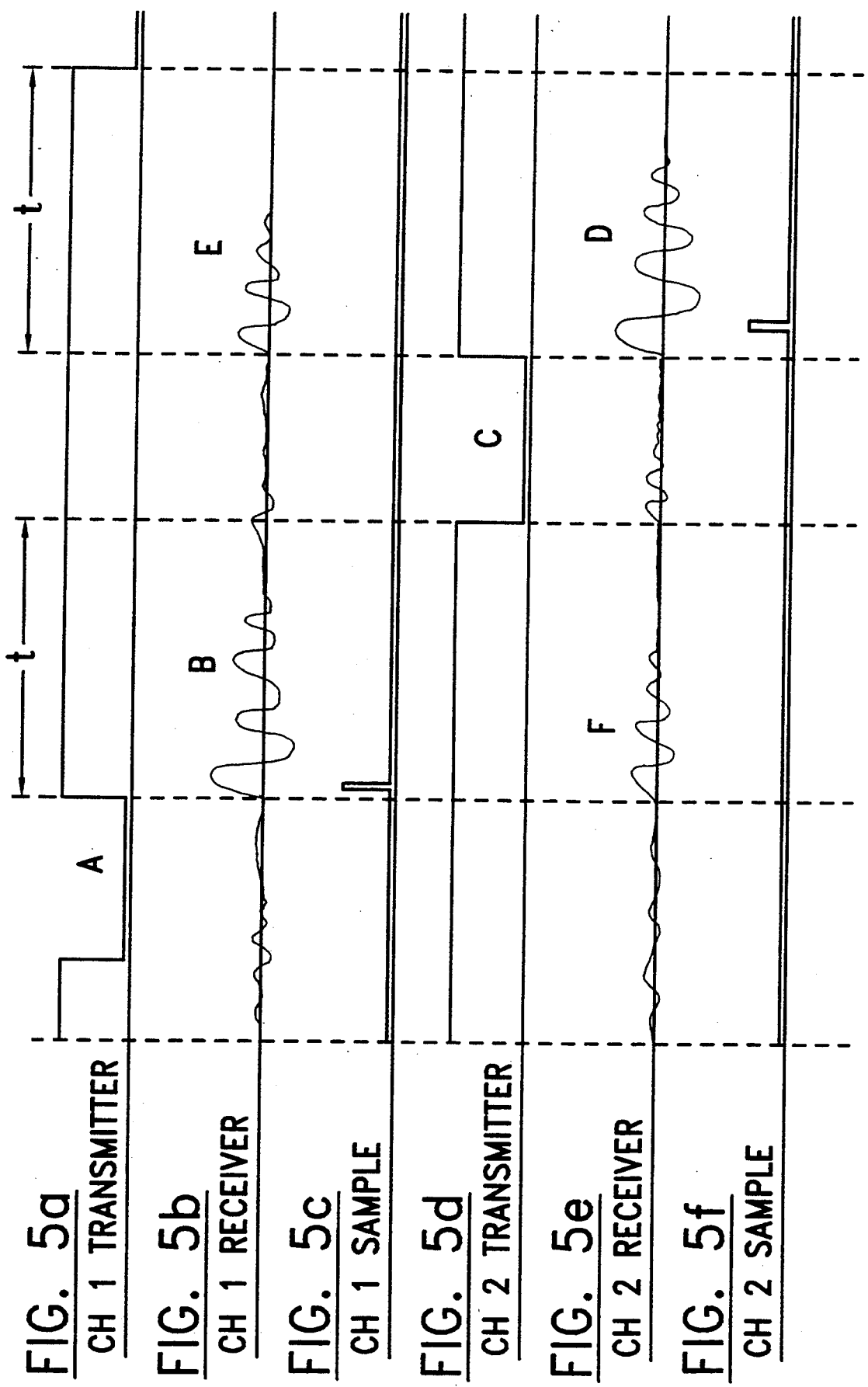

BOTTOM VIEW

SIDE VIEW

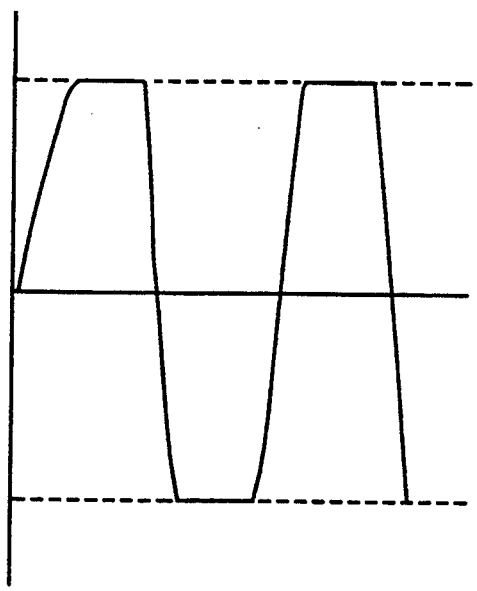
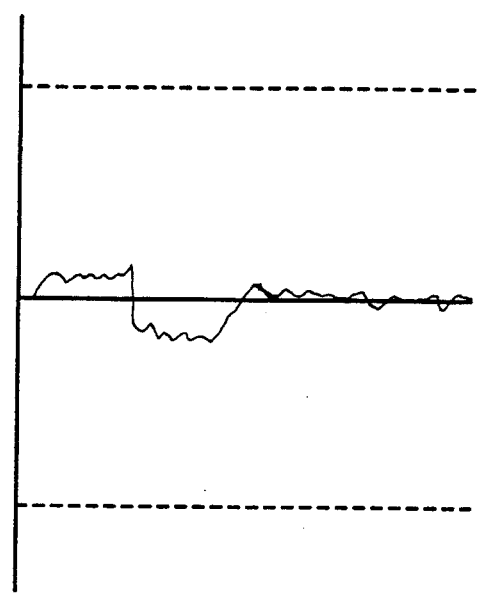
UNCALIBRATED
FIG. 7a
CALIBRATED
FIG. 7b
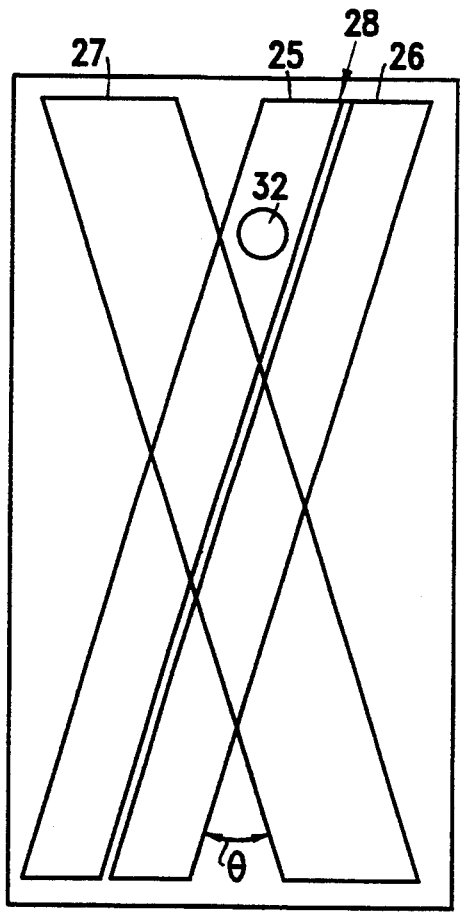
FIG. 8

METAL DETECTOR SYSTEM HAVING MULTIPLE, ADJUSTABLE TRANSMITTER AND RECEIVER ANTENNAS

CROSS-REFERENCE TO RELATED APPLICATIONS

This application is a continuation of U.S. application Ser. No. 07/786,305, filed on Nov. 1, 1991, now abandoned.

FIELD OF THE INVENTION

The present invention relates to a metal detector system and method of operating a metal detector system. More particularly, the metal detector system includes a calibrated transmitter-receiver antenna pair on each side of the metal detector system.

BACKGROUND INFORMATION

Pass-through metal detectors are used in the security access control field to screen people and objects passing through a portal at airports, courts, prisons, passenger ships, nuclear facilities, and other high-security areas, as well as to screen against employee theft, contamination and other purposes. Known metal detectors generally include one transmitter coil of one or more windings in an elongated symmetrical shape located in a panel on one side of the portal. The transmitter coil generally generates a pulsed magnetic field, which excites eddy currents in metal objects passing through the portal. Located in a panel on the opposite side of the portal is either one or a pair of receiver coils which are similar in size and shape to the transmitter coil. These receiver coils receive the magnetic field created by the eddy currents in the metal objects passing through the portal, as well as the magnetic field created by the transmitter coil.

A receiver antenna may include two identical receiver coils disposed in essentially the same plane and wound in opposite directions so that any signal that has equal amplitude through both coils, such as some forms of signal noise, are subtracted. This arrangement significantly reduces noise. The output of the receiver coils is connected to a resistor-capacitor circuit that creates a damped oscillating signal at the end of each transmitter pulse. A control circuit then processes this signal to amplify the eddy currents and to detect variations in the magnetic field caused by the moving metal. The circuit continuously compares the signal level to a threshold set by the operator, and triggers an alarm when the threshold is exceeded. The panels containing the coils may be connected at their tops with a crosspiece wide enough to permit passage.

Sheets of conductive metal (shields) are sometimes used on the outside of metal detectors to better prevent metal objects that are moving on the outside of the portal from being detected. The large eddy currents created in the metal shields can be much larger than the signal from the metal objects themselves, and can change the balance of the two coils, causing a very large output signal and saturation of the circuit.

Referring to FIG. 1, there is shown a schematic diagram of a metal detector of the prior art. Two receiver coils L1 and L2 are connected at their inner terminals to form a dual-coil receiver antenna. An outer terminal of receiver coil L1 is connected to an outer terminal of a resistor R1, a first terminal of a capacitor C1, and to a first input of a differential amplifier 1. Similarly, an outer terminal of receiver coil L2 is connected to an outer terminal of a resistor R2, a second terminal of capacitor C1, and to a second input of differential amplifier 1. The inner terminals of resistor R1 and resistor R2 are connected to each other, as well as to the inner terminals of receiver coil L1 and receiver coil L2. Together, the two receiver coils L1 and L2, resistors R1 and R2, capacitor C1 and differential amplifier 1 form a receiver 102.

An output of differential amplifier 1 is connected to an input of a control unit 2, an output of which is connected to an input of an amplifier 3. Finally, each of two outputs of amplifier 3 is connected to a respective terminal of a transmitter coil (transmitter antenna) L3. Together, the transmitter coil L3 and amplifier 3 form a transmitter 101.

The two receiver coils L1 and L2 are wound in opposite directions so that signals going through one coil are subtracted from signals going through the other coil. Because most electrical noise sources are a relatively long distance away, the noise through receiver coil L1 is approximately equal to the noise through receiver coil L2, i.e., the difference is approximately zero, and thus noise is reduced. This system of noise reduction operates without any active components and with signals of any amplitude.

The resistor-capacitor (RC) network including R1, R2, and C1 forms an oscillating circuit, which transmits a damped oscillating signal to differential amplifier 1. The oscillation starts when a pulse from the transmitter coil L3 ends. Amplifier 3 provides a pulse to transmitter coil L3 to form a magnetic field which creates eddy currents in a metal object (not shown) passing through a detection area 4. The control unit 2 performs various control functions, such as processing signals from the receiver, and controlling the transmitter timing.

Referring now to FIG. 2, there is shown a portion of the metal detector of the prior art of FIG. 1 disposed in a portal. The portal 201 includes a side panel 202 and a side panel 203, which are connected at the top by a crosspiece 204 wide enough to permit passage of a person. Side panel 202 contains the transmitter coil L3, while side panel 203 contains the two receiver coils L1 and L2.

A two-sided metal detector is known from U.S. Pat. No. 4,779,048, which describes a metal detector in which field coils and receiving coils are arranged on either side of a zone to be monitored. The field coil on one side and the field coil on the other side are alternately excited for radiating a magnetic field.

One problem with this system is that the indiscriminate placement of a transmitter antenna and a receiver antenna in a transmitter-receiver pair will cause the receiver to receive a much larger signal from the adjacent transmitter (i.e., the transmitter in the pair) than from the opposite transmitter, undesirably affecting the receiver's output. The indiscriminate placement may even create high output voltages caused by a field through one of the receiver coils being much larger than a field through the other receiver coil, so that the voltage difference between the coils is very large.

This system may attempt to overcome this high noise problem through the use of an analog switch (not shown). However, doing so chops the receiver signal and causes harmonics that affect the filtering of the signal. Moreover, when the receiver voltage is several volts, saturation and even damage to the system is possible. In order for damped oscillations to decrease to a safe level, a delay time would be too large to allow timely acquisition of the signal. High cost and resistance of the switch also cause problems with this technique. The system is very noisy, and may exhibit especially low detection in a zone approximately midway between the sides of the passage, resulting in a high false alarm rate.

It is an object of the present invention to provide a metal detector system and method of calibrating and operating a metal detector system which allows more information to be cleanly sensed and processed, among other advantages.

SUMMARY OF THE INVENTION

The present invention provides a metal detector system which includes a first planar surface, and a second planar surface opposite to the first planar surface to define a passage between the surfaces. A first transmitter antenna is adjustably supported on the first planar surface for transmitting a first signal for detecting a metal object in the passage. A first receiver antenna is adjustably supported on the second planar surface in a position opposite to a position of the first transmitter antenna for receiving the first signal from the first transmitter antenna and outputting a third signal in response to the first signal and a fourth signal in response to detection of a metal object in the passage. A second transmitter antenna is adjustably supported on the second planar surface for transmitting a second signal for detecting a metal object in the passage. A second receiver antenna is adjustably supported on the first planar surface in a position opposite to a position of the second transmitter antenna for receiving the second signal from the second transmitter antenna and outputting a fifth signal in response to the second signal and a sixth signal in response to detection of a metal object in the passage.

The position of the first receiver antenna relative to the position of the second transmitter antenna on the second planar surface is adjustable to prevent the output signals of the first receiver antenna from being based on the second signal from the second transmitter antenna, and likewise the position of the second receiver antenna relative to the position of the first transmitter antenna on the first planar surface is adjustable to prevent the output signal of the second receiver antenna from being based on the first signal from the first transmitter antenna.

The system according to the present invention provides a metal detector system and various methods of calibrating and operating a metal detector system, such as crossing an adjacent transmitter antenna and receiver antenna, increasing the distance between an adjacent transmitter antenna and receiver antenna, and/or positioning a metal shield to cover the antennas, producing two clean signals and resulting in fewer alarms due to innocent metal objects.

BRIEF DESCRIPTION OF THE DRAWINGS

FIGS. 5a–5f show timing diagrams for various signals of the metal detector system shown in FIG. 3.

FIGS. 7a and 7b show an example of an uncalibrated signal and a calibrated signal, respectively, for the transmitter-receiver antenna pair shown in FIG. 6.

FIG. 8 illustrates various methods of calibrating the transmitter-receiver antenna pair shown in FIG. 6.

DETAILED DESCRIPTION

Figure 3:
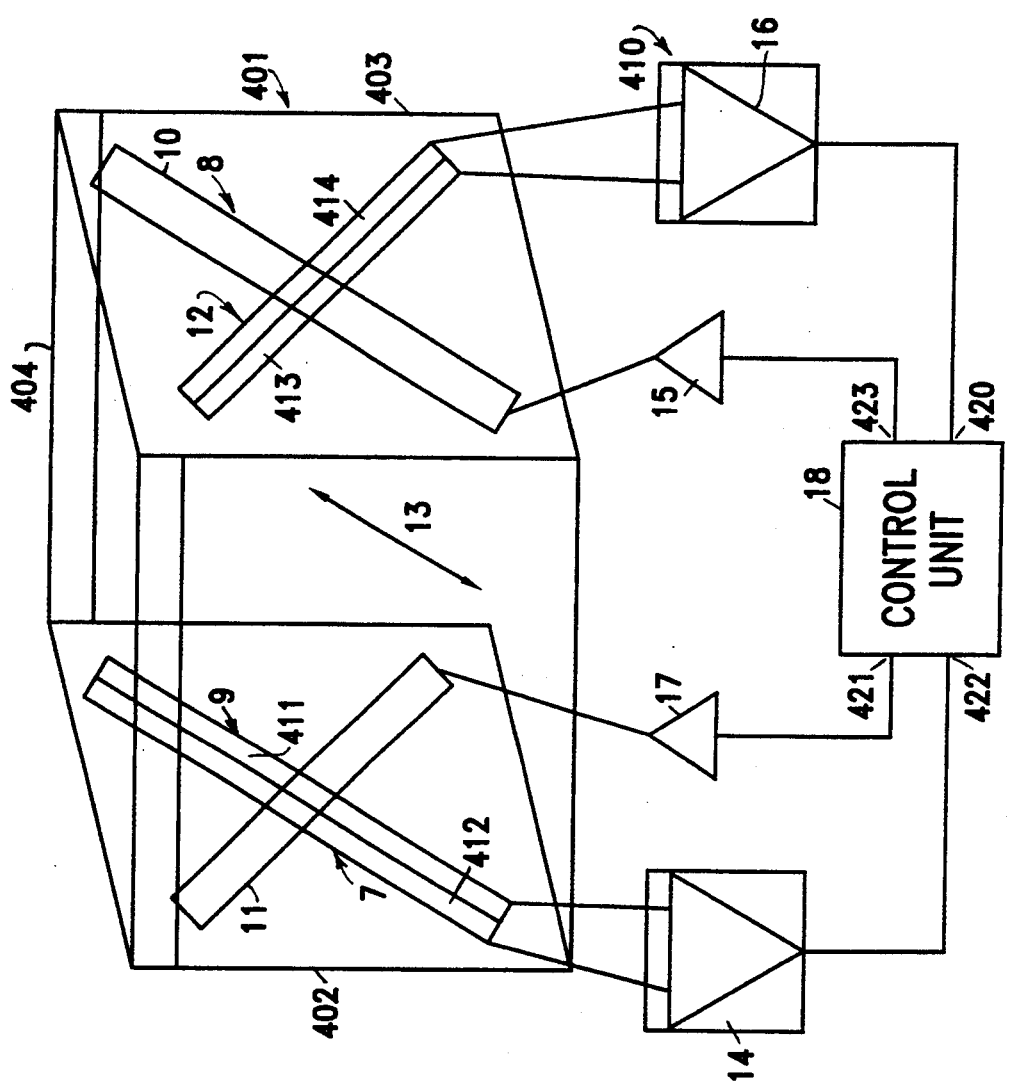
FIG. 3 shows an embodiment of a metal detector system according to the present invention.

Referring now to FIG. 3, there is shown an embodiment of a metal detector system 410 according to the present invention, supported by a portal 401, which includes a first side panel 40 which defines a vertical planar surface, an essentially opposite and parallel second side panel 403 which also defines a vertical planar surface, and a crosspiece 404 connecting the top of the first side panel 402 to the top of the second side panel 403.

The first side panel 402 adjustably supports a first transmitter-receiver antenna pair 7, which includes a first transmitter antenna 11 and a second receiver antenna 9. The first transmitter antenna 11 is formed by a single transmitter coil. The second receiver antenna 9 is a dual-coil receiver antenna and therefore includes two receiver coils 411 and 412.

Similarly, the second side panel 403 adjustably supports a second transmitter-receiver antenna pair 8, which includes a second transmitter antenna 10 and a first receiver antenna 12. The second transmitter antenna 10 is formed by a single transmitter coil. The first receiver antenna 12 is also a dual-coil receiver antenna and therefore also includes two receiver coils 413 and 414.

The position and size of the first receiver antenna 12 may, although not necessarily, essentially coincide with the position and size of the first transmitter antenna 11 (i.e., a plane containing the first receiver antenna and the first transmitter antenna may be essentially perpendicular to the first and second side panels, and therefore the first receiver antenna and first transmitter antenna may be positioned "opposite" to one another), and the position and size of the second receiver antenna g may, although not necessarily, essentially coincide with the position and size of the second transmitter antenna 10 (i.e., a plane containing the second receiver antenna and the second transmitter antenna may be likewise essentially perpendicular to the first and second side panels, and therefor the second receiver antenna and second transmitter antenna may also be positioned opposite to one another). Moreover, a plane containing the first transmitter-receiver antenna pair 7 may be essentially parallel to a plane containing the second transmitter-receiver antenna pair 8.

Figure 10:
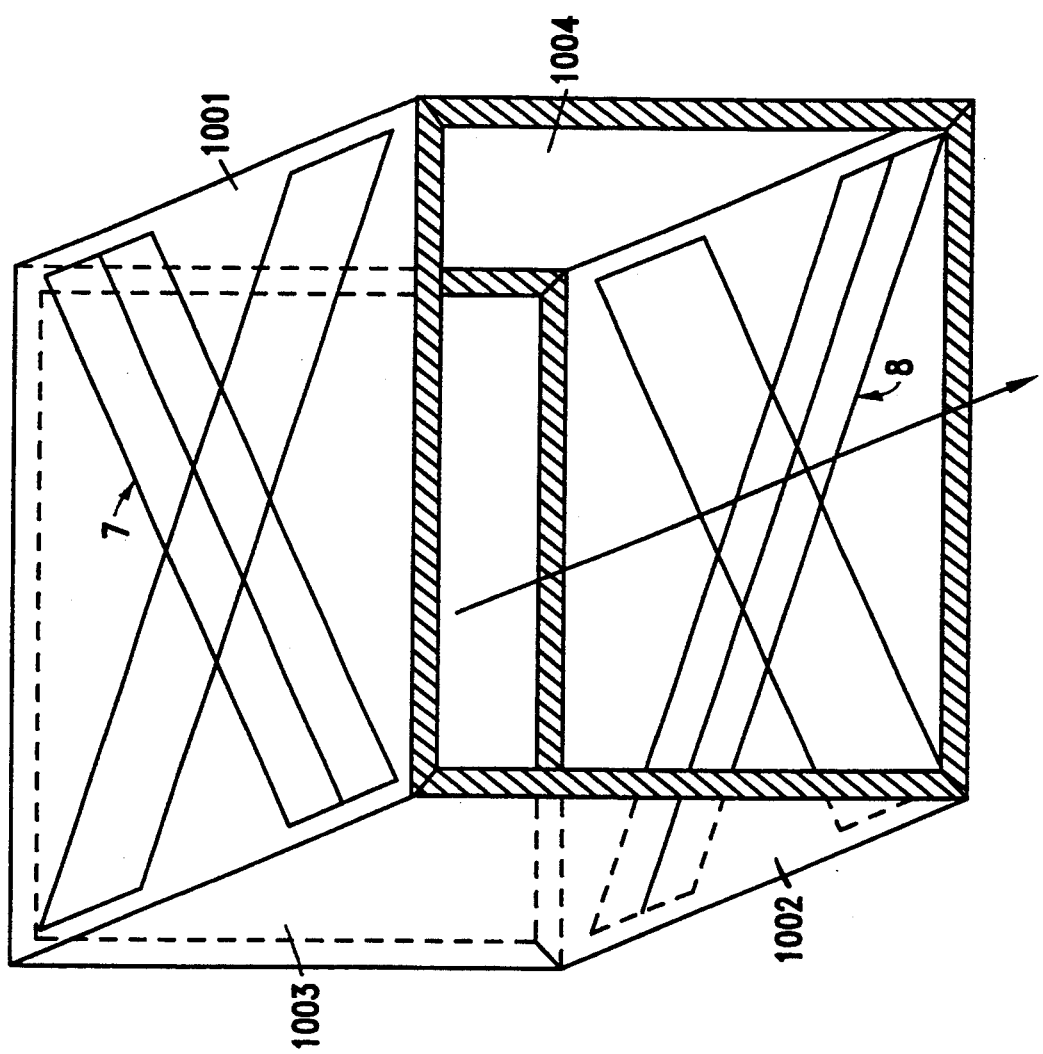
FIG. 10 shows yet another embodiment of a metal detector system according to the present invention.

As shown in FIG. 10, the metal detector may instead be disposed in a conveyor system for ore or food, for example, in which a top surface 1001 supports the first transmitter-receiver antenna pair 7, and an opposite bottom surface 1002 supports the second transmitter-receiver antenna pair 8. The two horizontal surfaces 1001, 1002 are coupled together at their edges by two side surfaces 1003, 1004 of the conveyor system.

Figure 1:
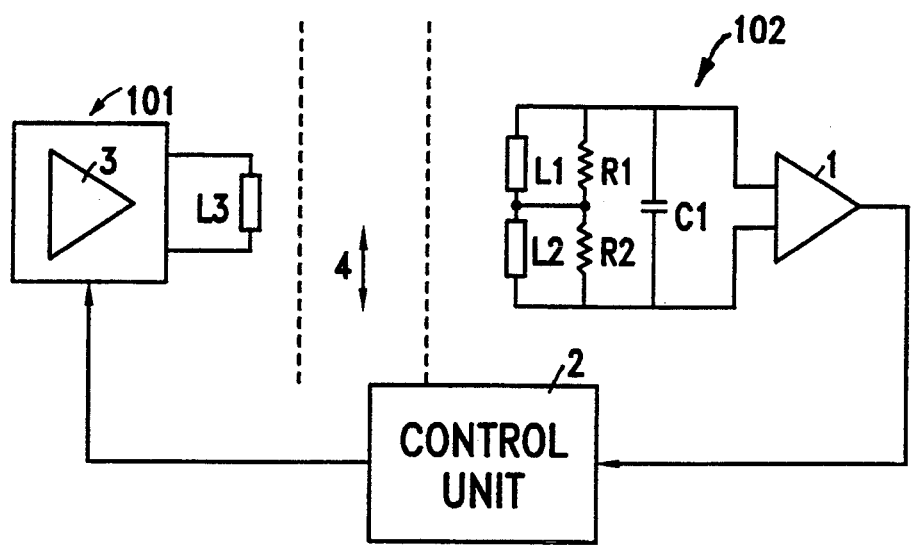
FIG. 1 shows a schematic diagram of a metal detector of the prior art.
Figure 2:
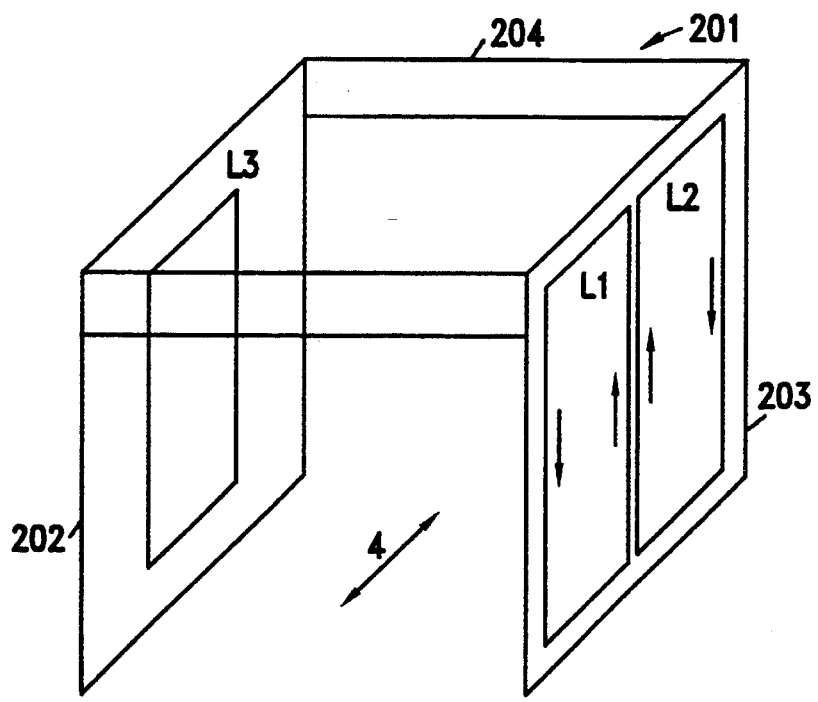
FIG. 2 shows a portion of the metal detector of the prior art shown in FIG. 1 disposed in a portal.

Each of the receiver coils 413, 414 of the first receiver antenna 12 is coupled to a respective input of a first differential amplifier 16 through an RC network as shown in FIG. 1. An output of the first differential amplifier 16 is coupled to a first input 420 of a control unit 18. A first output 421 of the control unit 18 is coupled to an input of a first transmitter amplifier 17, an output of which is coupled to the first transmitter antenna 11. These elements form (transmitter-receiver) Channel 1.

Similarly, each of the receiver coils 411, 412 of the second receiver antenna 9 is coupled to a respective input of a second differential amplifier 14 through an RC network as shown in FIG. 1. An output of the second differential amplifier 14 is coupled to a second input 422 of the control unit 18. A second output 423 of the control unit 18 is coupled to an input of a second transmitter amplifier 15, an output of which is coupled to the second transmitter antenna 10. These elements form (transmitter-receiver) Channel 2.

The metal detector system 410 includes Channel 1, Channel 2, and the control unit 18 which couples them. The control unit 18, which will be further explained, controls the operation of the system by performing various control functions, such as processing signals from the differential amplifiers 14, 16, controlling the timing of signal transmission, and controlling c user interface (not shown).

Therefore, the two transmitter-receiver antenna pairs 7, 8 are on opposite sides of a detection area 13. In operation, the first receiver antenna 12 receives a signal transmitted across the detection area 13 by the first transmitter antenna 11, and the second receiver antenna 9 receives a signal transmitted across the detection area 13 by the second transmitter antenna 10. In response, the first and second receiver antennas 12, 9 output different signals depending upon whether or not a metal object is detected in the detection area 13.

Figure 9:
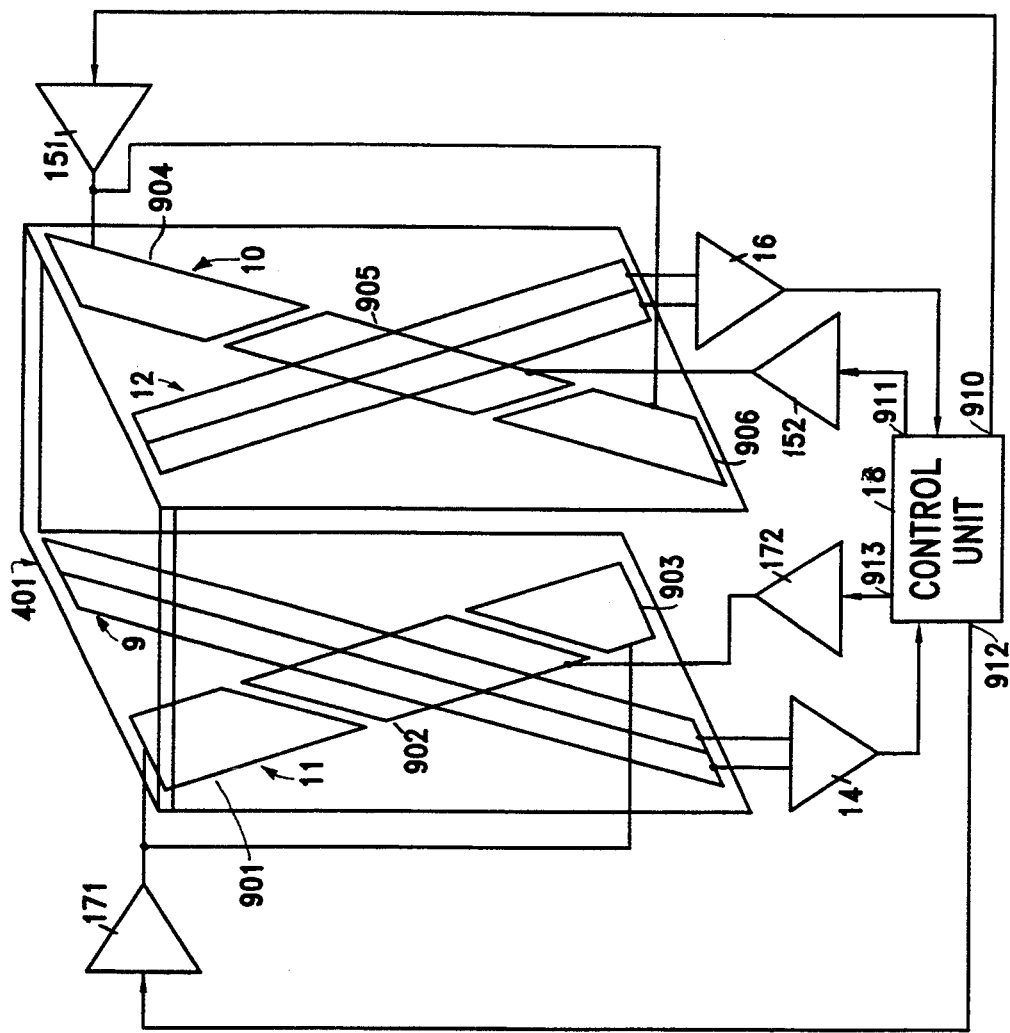
FIG. 9 shows another embodiment of a metal detector system according to the present invention which includes split transmitter antennas.

In another embodiment of a metal detector system according to the present invention, as shown in FIG. 9, the first transmitter antenna 11 may be split into several separate transmitter antennas 901, 902, 903. Similarly, the second transmitter antenna 10 may also be split into several separate transmitter antennas 904, 905, 906. An output 910 of the control unit 18 is coupled to an input of an amplifier 151, an output of which is coupled to both transmitter antennas 904 and 906. An output 911 of the control unit 18 is coupled to an input of an amplifier 152, an output of which is coupled to transmitter antenna 905. Similarly, an output 912 of the control unit 18 is coupled to an input of an amplifier 171, an output of which is coupled to both transmitter antennas 901 and 903. An output 913 of the control unit 18 is coupled to an input of an amplifier 172, an output of which is coupled to transmitter antenna 902.

Figure 4:
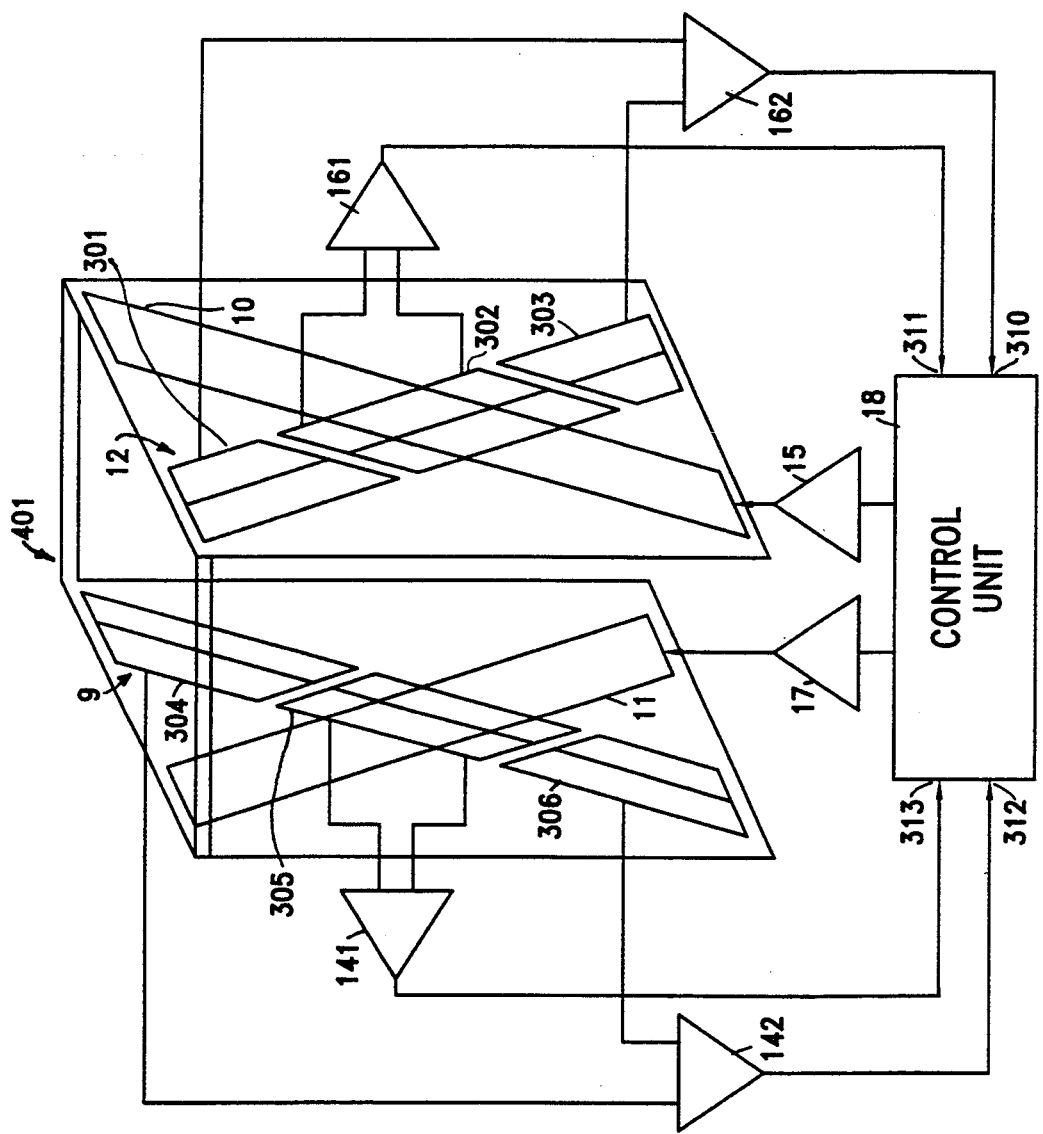
FIG. 4 shows another embodiment of a metal detector system according to the present invention which includes split receiver antennas.

In yet another embodiment of a metal detector system according to the present invention, as shown in FIG. 4, the first receiver antenna 12 may be split into several separate receiver antennas 301, 302, 303. Similarly, the second receiver antenna 9 may also be split into several separate receiver antennas 304, 305, 306. Receiver antennas 301 and 303 are coupled to f respective inputs of a differential amplifier 162, an output of which is coupled to an input 310 of the control unit 18. Receiver antenna 302 is coupled to both inputs of a differential amplifier 161, an output of which is coupled to an input 311 of the control unit 18. Similarly, receiver antennas 304 and 306 are coupled to respective inputs of a differential amplifier 142, an output of which is coupled to an input 312 of the control unit 18. Receiver antenna 305 is coupled to both inputs of a differential amplifier 141, an output of which is coupled to an input 313 of the control unit 18.

So as to better prevent interference between Channels 1 and 2, the control unit 18 may alternately pulse the transmitters of the Channels, as shown in FIGS. 5a and 5d. A pulse A transmitted by the first transmitter antenna 11 of Channel 1 (shown in FIG. 5a) creates a magnetic field which forces the first receiver antenna 12 into a state of damped oscillation, as indicated by a B in FIG. 5b. A point on this oscillation is sampled as shown in FIG. 5c, and the signal at that time is amplified by the first differential amplifier 16 and then processed by the control unit 18. After a delay time t (from the end of the pulse from the first transmitter antenna), the second transmitter antenna 10 of Channel 2 (under the control of the control unit 18) transmits a pulse C, as shown in Figure 5d The second receiver antenna 9 is forced into a state of damped oscillation (as indicated by a D in FIG. 5e). Sampling (FIG. 5f), amplification and processing are then performed in an analogous fashion to Channel 1. The procedure is then repeated after another delay time t.

The present invention provides a method to eliminate the problem of adjacent receiver-transmitter "crosstalk" (i.e., prevent interference) as described above by the discriminate placement of a transmitter antenna and its adjacent dual-coil receiver antenna. The method is referred to as calibrating the antennas.

Figure 6B:
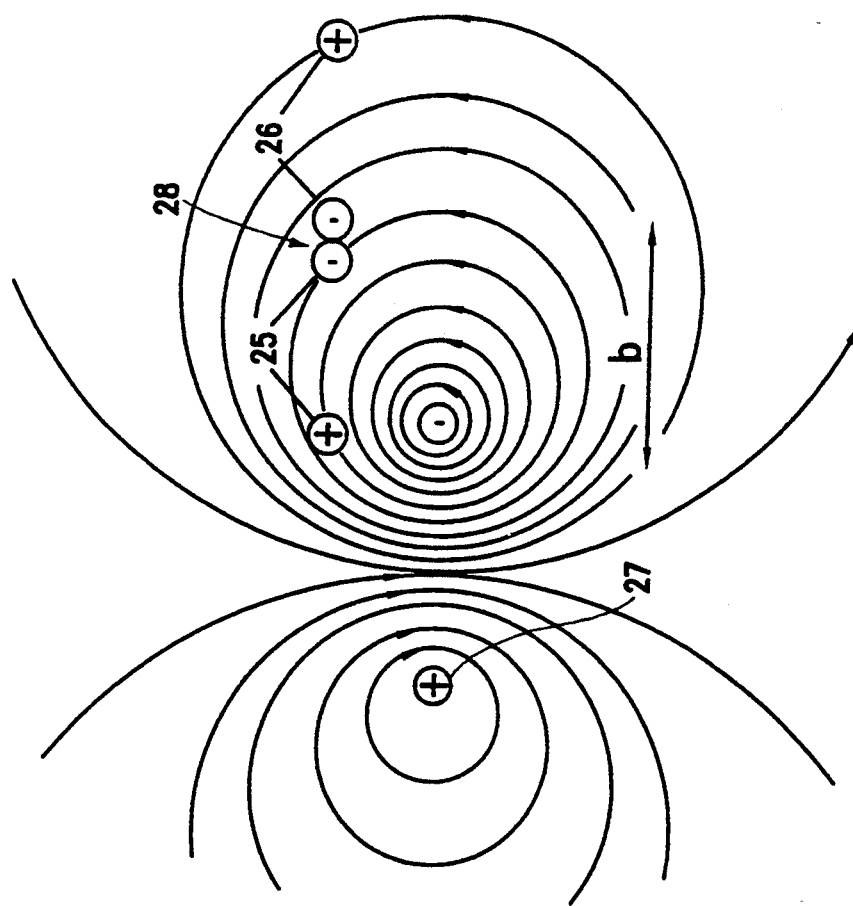
FIGS. 6a and 6b show a side and bottom view, respectively, of a transmitter-receiver antenna pair according to an embodiment of the present invention.
Figure 6A:
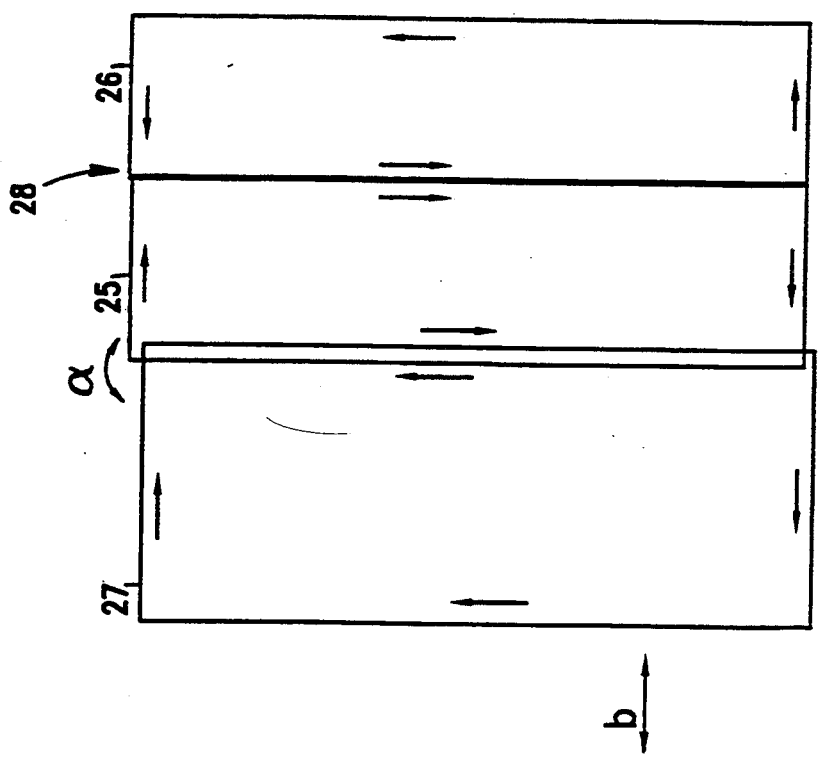

FIG. 6a shows a side view of a transmitter-receiver antenna pair (i.e., adjacent transmitter and receiver antennas) to be calibrated. A plane containing the transmitter antenna (coil) 27 may be parallel to a plane containing adjacent receiver antenna 28, or they may intersect at an angle alpha. The lines of flux generated by the transmitter antenna 27 cut through the plane containing adjacent first and second receiver coils 25 and 26 of the receiver antenna 28, as can be seen in a bottom view of the antennas shown in FIG. 6b. When the intensity of the field through the first receiver coil 25 is equal to the intensity of the field through the second receiver coil 26, the mutual inductance between each of the receiver coils 25, 26 and the transmitter antenna 27 is equal, and therefore the resultant voltage from the dual-coil receiver antenna 28 is zero and the coils are properly calibrated. Because voltage subtraction is accomplished by winding the coils in opposite directions, no additional circuitry is required, and the voltage received by each individual receiver coil can be very high so long as the difference is still approximately zero.

An example of an uncalibrated signal is shown in FIG. 7a, and an example of a calibrated signal is shown in FIG. 7b. Once a transmitter-receiver antenna pair is calibrated, the other transmitter-receiver antenna pair in a metal detector system may be correspondingly calibrated.

One embodiment of a method of calibration according to the present invention includes the step of adjusting the position (geometry) of the receiver coils 25, 26 with respect to the transmitter antenna 27 in a direction indicated by a bi-directional arrow b in FIGS. 6a and 6b until the mutual inductance between the transmitter antenna 27 and each of the receiver coils 25, 26 is equal, as measured, for example, on an oscilloscope (not shown). After the calibration is performed, the antennas are fixed (e.g., glued) in the calibrated positions.

Another embodiment of a method of calibration according to the present invention includes the step of increasing a distance d (as shown in FIG. 6b) between the two receiver coils 25, 26 and the transmitter antenna 27 (i.e., increasing the distance d between a plane containing the receiver coils 25, 26 and a plane containing the transmitter antenna 27) until the mutual inductance between the transmitter antenna 27 and each of the receiver coils 25, 26 is equal. As a result, calibration of the antennas becomes more tolerant of movement between the antennas over time and temperature changes.

Yet another embodiment of a method of calibrating and increasing stability of the coils according to the present invention is illustrated in FIG. 8. By crossing the antennas 27, 28 at an angle theta, the variations in the mutual inductance between the transmitter coil 27 and receiver coils 25, 26 are determined by the fields at the tips of the coils. Since the distance between these tips is large, the amount of antenna movement needed for calibration is increased. This arrangement results in improved detection of elongated objects in certain orientations, such as a knife in the vertical position.

Yet another embodiment of a method of calibration according to the present invention includes the step of inserting a conductive piece of metal 32 near the coils and moving the piece of metal 32 until the proper calibration is established, as also shown in FIG. 8. After calibration, the piece of metal 32 is fixed in the calibrated location. This changes the mutual inductance between the coils and creates eddy currents in a metal object detected.

Figure 11:
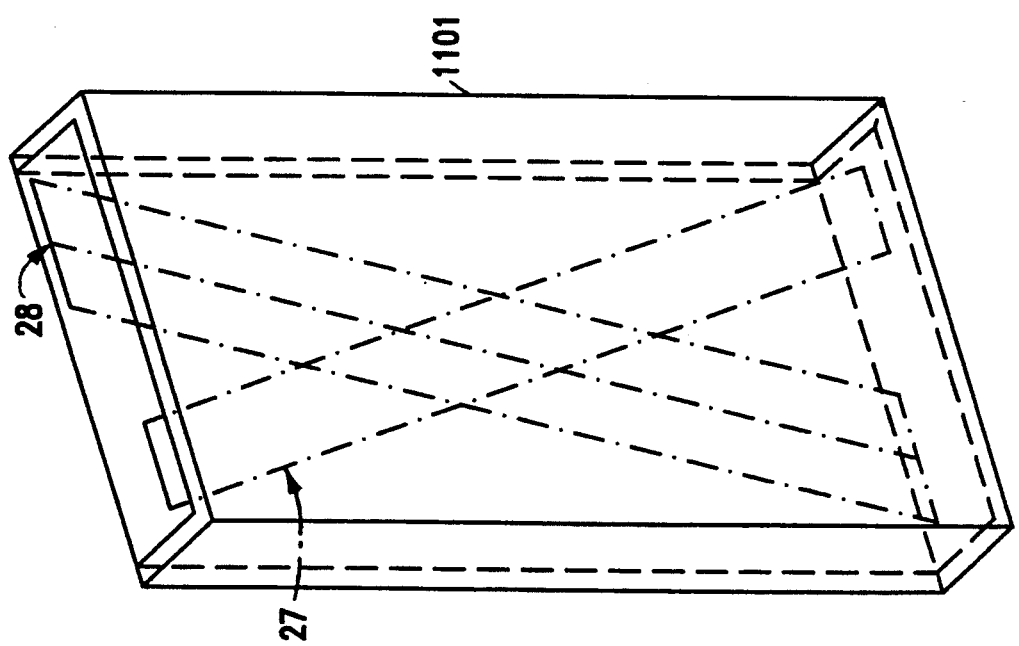
FIG. 11 illustrates the use of a conductive metal shield with the transmitter-receiver antenna pair shown in FIG. 6.

As shown in FIG. 11, prior to calibration, a conductive metal shield 1101 may cover the outside of a transmitter-receiver antenna pair 27, 28 to reduce the detection of moving metal objects and other magnetic noise outside of the detection area. In order to do this, the metal shield 1101 is calibrated to the adjacent transmitter-receiver antenna pair. This is done in the same manner as described above, except that the antennas and/or the metal shield 1101 may be moved to accomplish proper calibration. Adding a metal shield in this manner automatically compensates for any imperfections in shape or composition of the coils.

Figure 14:
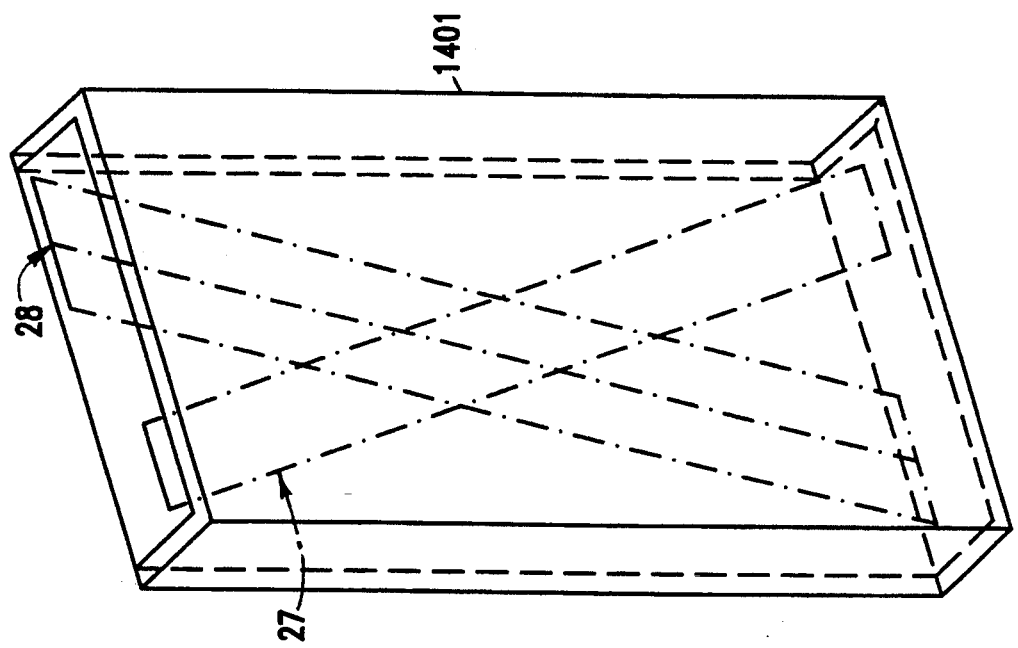
FIG. 14 shows still another embodiment of a metal detector system according to present invention.

Still another embodiment of a method according to the present invention includes the step of encapsulating each coil and each coil pair in an amorphous material 1401, as shown in FIG. 14, such as polystyrene foam, which may not warp, may be unaffected by humidity, relatively unaffected by and indeed insulate the coils from temperature changes, and protect the calibration of the coil pairs.

Figure 12:
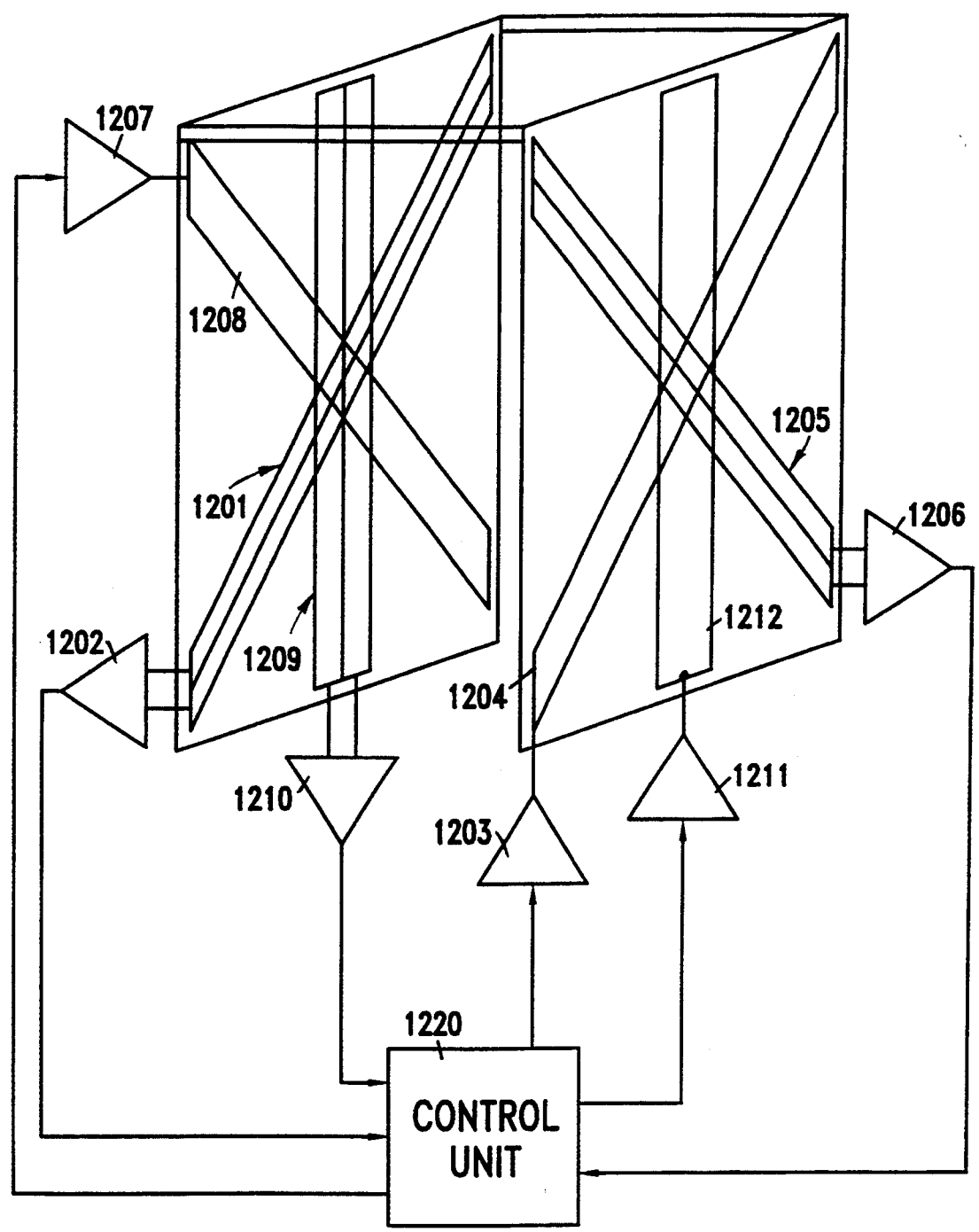
FIG. 12 shows still another embodiment of a metal detector system according to the present invention which includes three transmitter-receiver channels.
Figure 13:
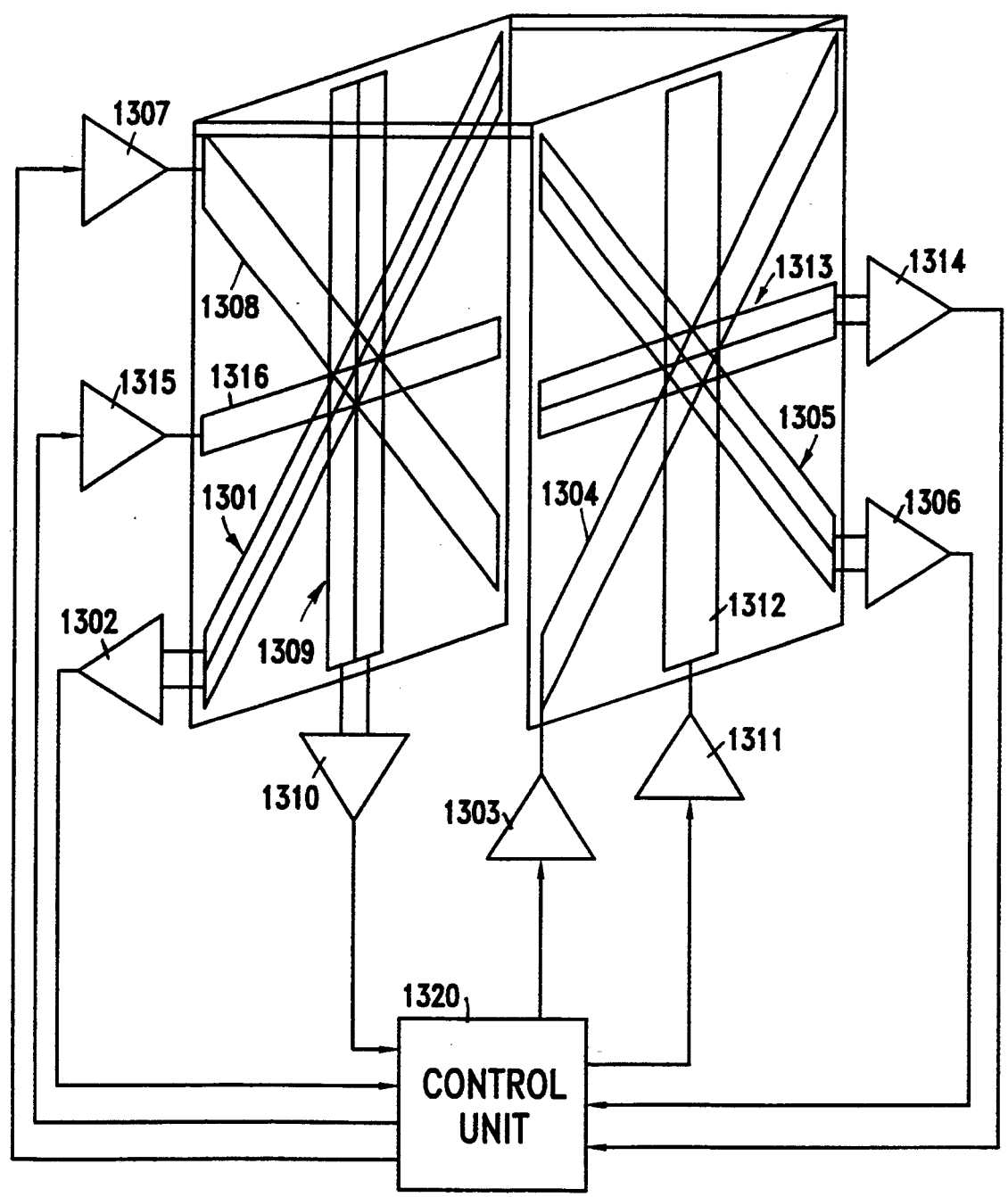
FIG. 13 shows still another embodiment of a metal detector system according to the present invention which includes four transmitter-receiver channels.

Still another embodiment of a method according to the present invention relates to calibrating a metal detector having more than two (transmitter-receiver) channels so that there is no "crosstalk" between any transmitter antenna and any adjacent receiver antenna. This can be done through any of the methods described above, except that the adjacent transmitter antennas and receiver antennas are calibrated one at a time. As examples, FIG. 12 shows three transmitter-receiver channels 1201–1204, 1205–1208, 1209–1212 having a control unit 1220, and FIG. 13 shows four transmitter-receiver channels 1301–1304, 1305–1308, 1309–1312, 1313–1316 having a control unit 1320.

An embodiment of a method of operating a metal detector system according to the present invention includes the step of continuously comparing the corresponding amplitudes of the two receiver signals to better detect a metal object.

Another embodiment of a method of operating a metal detector system according to the present invention includes the step of determining the position of a metal object in the detection area by comparing the signal from Channel 1 to the signal from Channel 2. If the signals are approximately equal, the object is approximately in the center of the portal. If, on the other hand, the signal from one Channel is larger than the signal from the other Channel, the object is closer to the receiver of the Channel with the larger signal.

Yet another embodiment of a method of operating a metal detector system according to the present invention includes the step of sampling a portion F of the signal received by a receiver from an adjacent transmitter of Channel 1, and sampling a portion E of the signal received by a receiver from an adjacent transmitter of Channel 2, as shown in FIG. 5b, in order to gain more information on the position of a metal object. However, in this manner, only metal objects close to the side of the receiver antenna are detected.

What is claimed is:
1. A metal detector system comprising:
   a first planar surface;
   a second planar surface opposite said first planar surface to define a passage therebetween;
   a first transmitter antenna adjustably supported on said first planar surface for transmitting a first signal for detecting a metal object in said passage;
   a first receiver antenna adjustably supported on said second planar surface in a position opposite to a position of said first transmitter antenna for receiving said first signal from said first transmitter antenna and outputting a third signal in response to said first signal and a fourth signal in response to detection of a metal object in said passage;
   a second transmitter antenna adjustably supported on said second planar surface for transmitting a second signal for detecting a metal object in said passage;
   a second receiver antenna adjustably supported on said first planar surface in a position opposite to a position of said second transmitter antenna for receiving said second signal from said second transmitter antenna and outputting a fifth signal in response to said second signal and a sixth signal in response to detection of a metal object in said passage;
   said position of said first receiver antenna relative to said position of said second transmitter antenna on said second planar surface being adjustable to prevent said output signals of said first receiver antenna from being based on said second signal from said second transmitter antenna, and said position of said second receiver antenna relative to said position of said first transmitter antenna on said first planar surface being adjustable to prevent said output signal of said second receiver antenna from being based on said first signal from said first transmitter antenna.

2. The system as recited in claim 1, wherein said first and second planar surfaces include a first and second vertical side panel, respectively, of a portal.

3. The system as recited in claim 1, further comprising a conveyor system having oppositely disposed surfaces defining said planar surfaces.

4. The system as recited in claim 2, wherein said first receiver antenna and said second transmitter antenna are of elongated rectangular shape and are crossed at a predetermined angle, and said second receiver antenna and said first transmitter antenna are of elongated rectangular shape and are crossed at said predetermined angle.

5. The system as recited in claim 4, further comprising a control unit coupled to outputs of said first and second receiver antennas for processing said third, fourth, fifth and sixth signals and for indicating detection of a metal object in said passage in response thereto.

6. The system as recited in claim 5, wherein the size of said first receiver antenna coincides with the size of said second transmitter antenna, and the size of said second receiver antenna coincides with the size of said first transmitter antenna.

7. The system as recited in claim 6, wherein each of said first and second receiver antennas includes two receiver coils wound in opposite direction.

8. The system as recited in claim 7, wherein a plane containing said first transmitter antenna and said two receiver coils of said second receiver antenna is parallel to a plane containing said second transmitter coil and said two receiver coils of said first receiver antenna.

9. The system as recited in claim 7, wherein a plane containing said first transmitter antenna and a plane containing said two receiver coils of said second receiver antenna intersect at a second predetermined angle, and a plane containing said second transmitter antenna and a plane containing said two receiver coils of said first receiver antenna intersect at the second predetermined angle.

10. The system as recited in claim 7, further comprising a first differential amplifier coupled to an output of each of said two coils of said first receiver antenna, and a second differential amplifier coupled to an output of each of said two coils of said second receiver antenna, outputs of said first and second differential amplifiers being coupled to respective inputs of said control unit.

11. The system as recited in claim 10, wherein the mutual inductances between said first and second transmitter antennas and each of said two coils of said second and first receiver antennas, respectively, are approximately equal.

12. The system as recited in claim 1, further comprising a piece of conductive metal fixed in close proximity to at least one of said antennas for preventing said output signals of said first receiver antenna from being based on said second signal from said second transmitter antenna and for preventing said output signals of said second receiver antenna from being based on said first signal from said first transmitter antenna.

13. The system as recited in claim 12, further comprising an amorphous material encapsulating the coils.

14. The system as recited in claim 13, wherein at least one of said first and second transmitter antennas is split into a plurality of separate transmitter antennas.

15. The system as recited in claim 13, wherein at least one of said first and second receiver antennas is split into a plurality of separate receiver antennas.

16. The system as recited in claim 13, further comprising at least one additional transmitter antenna adjustably supported on said second side panel for transmitting an additional signal, and at least one additional receiver antenna adjustably supported on said first side panel in a position opposite to a position of said additional transmitter antenna for receiving said additional signal from said additional transmitter antenna.

17. The system as recited in claim 13, further comprising a first plurality of first transmitter antennas adjustably supported on said first side panel, a second plurality of second transmitter antennas adjustably supported on said second side panel, a first plurality of first receiver antennas adjustably supported on said second side panel in positions opposite to positions of said first transmitter antennas, and a second plurality of second receiver antennas adjustably supported on said first side panel in positions opposite to positions of said second transmitter antennas.

18. A metal detector system comprising:
a first planar surface;
a second planar surface opposite said first planar surface to define a passage therebetween;
a first transmitter antenna adjustably supported on said first planar surface for transmitting a first signal for detecting a metal object in said passage;
a first receiver antenna adjustably supported on said second planar surface in a position opposite to a position of said first transmitter antenna for receiving said first signal from said first transmitter antenna and outputting a third signal in response to said first signal and a fourth signal in response to detection of a metal object in said passage;
a second transmitter antenna adjustably supported on said second planar surface for transmitting a second signal for detecting a metal object in said passage;
a second receiver antenna adjustably supported on said first planar surface in a position opposite to a position of said second transmitter antenna for receiving said second signal from said second transmitter antenna and outputting a fifth signal in response to said second signal and a sixth signal in response to detection of a metal object in said passage; and
a metal shield adjustably positioned to cover said antennas and to prevent said output signals of said first receiver antenna from being based on said second signal from said second transmitter antenna and to prevent said output signals of said second receiver antenna from being based on said first signal from said first transmitter antenna.

19. A method of calibrating a metal detector having a first transmitter antenna on a first side of a portal for transmitting a first signal, a second transmitter antenna on a second side of the portal opposite the first side for transmitting a second signal, a first receiver antenna on the second side of the portal opposite the first transmitter antenna for receiving the first signal from the first transmitter antenna, and a second receiver antenna on the first side of the portal opposite the second transmitter antenna for receiving the second signal from the second transmitter antenna, comprising the steps of:

adjusting the position of the first receiver antenna relative to the position of the second transmitter antenna for preventing an output signal of the first receiver antenna from being based on the second signal from the second transmitter antenna; and correspondingly adjusting the position of the second receiver antenna relative to the position of the first transmitter antenna for preventing an output signal of the second receiver antenna from being based on the first signal from the first transmitter antenna.

20. The method as recited in claim 19, wherein each antenna is of elongated rectangular shape, and the adjustment of the positions of the antennas includes crossing the first receiver antenna with the second transmitter antenna at a predetermined angle and crossing the second receiver antenna with the first transmitter antenna at the predetermined angle.

21. The method as recited in claim 19, wherein the adjustment of the positions of the antennas includes changing a distance between the first receiver antenna and the second transmitter antenna, and between the second receiver antenna and the first transmitter antenna.

22. The method as recited in claim 19, further comprising the step of fixing a piece of conductive metal in close proximity to at least one of the antennas for preventing the output signal of the first receiver antenna from being based on the second signal from the second transmitter antenna and for preventing the output signal of the second receiver antenna from being based on the first signal from the first transmitter antenna.

23. A method of calibrating a metal detector having a first plurality of first transmitter antennas on a first side of a portal for transmitting a first plurality of first signals, a second plurality of second transmitter antennas on a second side of the portal opposite the first side for transmitting a second plurality of second signals, a first plurality of first receiver antennas on the second side of the portal opposite the first transmitter antennas for receiving the first signals from the first transmitter antennas, and a second plurality of second receiver antennas on the first side of the portal opposite the second transmitter antennas for receiving the second signals from the second transmitter antennas, comprising the steps of:

adjusting the position of each of the first receiver antennas relative to the position of each of the second transmitter antennas for preventing output signals of the first receiver antennas from being based on the second signals from the second transmitter antennas; and correspondingly adjusting the position of each of the second receiver antennas relative to the position of each of the first transmitter antennas for preventing output signals of the second receiver antennas from being based on the first signals from the first transmitter antennas.

24. A metal detector system comprising:

a first planar surface;

a second planar surface opposite said first planar surface to define a passage therebetween;

a first transmitter antenna adjustably supported on said first planar surface for transmitting a first signal for detecting a metal object in said passage;

a first receiver antenna adjustably supported on said second planar surface in a position opposite to a position of said first transmitter antenna for receiving said first signal from said first transmitter antenna and outputting a third signal in response to said first signal and a fourth signal in response to detection of a metal object in said passage;

a second transmitter antenna adjustably supported on said second planar surface for transmitting a second signal for detecting a metal object in said passage;

a second receiver antenna adjustably supported on said first planar surface in a position opposite to a position of said second transmitter antenna for receiving said second signal from said second transmitter antenna and outputting a fifth signal in response to said second signal and a sixth signal in response to detection of a metal object in said passage;

said position of said first receiver antenna relative to said position of said second transmitter antenna on said second planar surface being adjustable to prevent said output signals of said first receiver antenna from being based on said second signal from said second transmitter antenna, and said position of said second receiver antenna relative to said position of said first transmitter antenna on said first planar surface being adjustable to prevent said output signal of said second receiver antenna from being based on said first signal from said first transmitter antenna;

wherein said first receiver antenna and said second transmitter antenna are of elongated rectangular shape and are crossed at a predetermined angle, and said second receiver antenna and said first transmitter antenna are of elongated rectangular shape and are crossed at said predetermined angle.

* * * * *